United States Patent [19]

Terae et al.

[11] Patent Number: 4,690,713

[45] Date of Patent: Sep. 1, 1987

[54] ANTIFOAM COMPOSITION

[75] Inventors: Nobuyuki Terae; Masaaki Yamaya; Fumio Okada, all of Gunma, Japan

[73] Assignee: Shin-Etsu Chemical Co., Ltd., Tokyo, Japan

[21] Appl. No.: 694,218

[22] Filed: Jan. 24, 1985

[30] Foreign Application Priority Data

Jan. 27, 1984 [JP] Japan .................. 59-13178

[51] Int. Cl.$^4$ .................. C09K 3/00; B01D 17/00
[52] U.S. Cl. .................. 106/287.16; 106/287.12; 106/287.14; 252/358
[58] Field of Search .................. 106/287.16, 287.12, 106/287.14; 252/358

[56] References Cited

U.S. PATENT DOCUMENTS

| | | | |
|---|---|---|---|
| 2,702,793 | 2/1955 | Smith | 252/358 |
| 4,076,648 | 2/1978 | Rosen | 252/358 |
| 4,101,443 | 7/1978 | Rosen | 252/358 |
| 4,145,308 | 3/1979 | Simoneau et al. | 252/358 |
| 4,377,493 | 3/1983 | Boycan | 252/358 |
| 4,443,359 | 4/1984 | Shimizu et al. | 252/358 |
| 4,486,336 | 12/1984 | Pape et al. | 252/358 |
| 4,514,319 | 4/1985 | Kulkarni | 252/358 |

Primary Examiner—Theodore Morris
Attorney, Agent, or Firm—Jules E. Goldberg

[57] ABSTRACT

The antifoam composition provided by the invention comprises (a) 100 parts by weight of a hydrocarbon oil, e.g. spindle oil, or a silicone fluid, e.g. polydimethylsiloxane fluid, having a viscosity of 20 to 1,000,000 centistokes at 25° C., (b) 0.1 to 40 parts by weight of an organosilane compound having 1 to 3 hydroxy groups or hydrolyzable groups, e.g. alkoxy, acyloxy and alkenyloxy groups, (c) 1 to 40 parts by weight of a finely divided silica powder and, optionally, (d) up to 5 parts by weight of a catalyst. The antifoam composition can exhibit excellent and durable defoaming activity even under vigorous agitation or in an alkaline condition of the foaming liquid.

6 Claims, No Drawings

ANTIFOAM COMPOSITION

BACKGROUND OF THE INVENTION

The present invention relates to a novel antifoam composition or, more particularly, to an antifoam composition having excellent foam-breaking and foam-suppressing activity and capable of exhibiting excellent defoaming effect even under violent agitation or even in an alkaline condition of the foaming liquid.

As is well known, silicone-based antifoam agents comprising a dimethylpolysiloxane as the principal ingredient belong to the class of the most widely used antifoam agents useful as a foam-breaking or foam-suppressing agent in chemical industries, food industries, petroleum industries, textile industries, pharmaceutical industries and the like by virtue of the outstandingly superior properties thereof in comparison with other types of antifoam compositions. Even the silicone-based antifoam agent is, however, not almighty and the defoaming activity thereof is sometimes rapidly lost when the foaming liquid admixed with the antifoam agent is violently agitated in contact with air or, in particular, violently agitated at an elevated temperature as in the aeration tank of a sewage disposal plant or in the jet dyeing. This problem is even more serious when the liquid or sewage under the defoaming treatment is in an alkaline condition so that the antifoam agent must be continuously or repeatedly introduced into the foaming liquid or sewage to cause a great economical disadvantage.

Several methods for the improvement of a silicone-based antifoam agent have been proposed in view of the above mentioned problems including, while the silicone-based antifoam agents are usually formulated with a finely divided silica filler, a method in which the silica filler is subjected in advance to a hydrophobic treatment with dimethyl dichlorosilane and the like (see, for example, Japanese Patent Publication No. 52-31836) and a method in which the silica filler is treated with a nitrogen-containing organosilicon compound prior to blending with the silicone (see, for example, Japanese Patent Publication No. 51-35556). These methods for improvements are also not quite satisfactory because the hydrophobic treatment of the silica filler is a complicated and uneconomical process due to the long time taken for the treatment and the necessity of special facilities therefor.

Alternatively, an improved antifoam composition has been proposed which comprises a hydrocarbon oil admixed with an organohydrogenpolysiloxane, a silica filler and a catalyst (see, for example, Japanese Patent Kokai No. 57-48307). The antifoam composition of this type is also not free from several problems and disadvantages that the silica filler must be treated in advance under heating with admixture of an organometallic catalyst in order to obtain a satisfactory effect of surface treatment, that hydrogen gas is always produced in the course of the treatment to cause a danger of fire or explosion and that the defoaming activity thereof is not strong enough in respect of the durability.

SUMMARY OF THE INVENTION

It is therefore an object of the present invention to provide a novel and improved antifoam composition free from the above described problems and disadvantages in the conventional antifoam compositions.

More particularly, the object of the present invention is to provide an antifoam composition capable of exhibiting excellent defoaming effect even under violent agitation of the foaming liquid or even when the foaming liquid is in an alkaline condition with no problem of hydrogen gas evolution and with outstanding inexpensiveness.

Thus, the novel antifoam composition provided by the present invention comprises:

(a) 100 parts by weight of a hydrophobic base fluid selected from the class consisting of hydrocarbon oils and organopolysiloxane fluids having a viscosity in the range from 20 to 1,000,000 centistokes at 25° C.;

(b) from 0.1 to 40 parts by weight of an organosilicon compound or an organosilane compound represented by the general formula $R^1{}_a Y_b Si$, in which $R^1$ is a substituted or unsubstituted monovalent hydrocarbon group having 1 to 20 carbon atoms, Y is a group selected from the class consisting of alkoxy groups, acyloxy groups and alkenyloxy groups having 1 to 6 carbon atoms and a hydroxy group and the suffixes a and b are each a positive integer of 1, 2 or 3 with the proviso that $a+b=4$;

(c) from 1 to 40 parts by weight of a finely divided silica powder; and (d) up to 5 parts by weight of a catalyst.

DETAILED DESCRIPTION OF THE PREFERRED EMBODIMENTS

The above mentioned component (a) is the base ingredient in the inventive antifoam composition and is a hydrophobic fluid selected from the class consisting of organopolysiloxane fluids and hydrocarbon oils. The organopolysiloxane is a compound represented by the average unit formula $$R^2{}_c SiO_{\frac{4-c}{2}},$$

which $R^2$ is a substituted or unsubstituted monovalent hydrocarbon group having 1 to 20 carbon atoms selected from the class consisting of alkyl groups such as methyl, ethyl, propyl and butyl groups, alkenyl groups such as vinyl and allyl groups and aryl groups such as phenyl and tolyl groups as well as those substituted groups obtained by the replacement of all or a part of the hydrogen atoms in the above named hydrocarbon groups with halogen atoms, cyano groups and the like substituents such as chloromethyl, 3,3,3-trifluoropropyl and cyanopropyl groups and c is a positive number in the range from 1.9 to 2.1 inclusive on an average. Exemplary of the organopolysiloxane are dimethylpolysiloxane, dimethylpolysiloxane, diethylpolysiloxane, methylphenylpolysiloxane, polydimethylpolydiphenyl siloxane copolymers, poly(methyl 3,3,3-trifluoropropyl)siloxane, polydimethyl-poly(chloropropyl methyl)siloxane and the like, of which dimethylpolyiloxane fluids are particularly preferable from the standpoint of excellent defoaming activity and inexpensiveness. Each of the terminal groups at the molecular chain ends of the organopolysiloxanes may be usually a trimethylsilyl group but can be a dimethylhydroxysilyl group.

The hydrocarbon oil includes aliphatic, alicyclic and aromatic hydrocarbon oils, of which aliphatic ones are preferred such as heptane, octane, nonane, decane, dodecane, tetradecane, hexadecane and the like having a boiling point of 70° C. or higher. Commercially available spindle oils are suitable as such. The hydrophobic base fluid should be liquid at room temperature having a viscosity in the range from 20 to 1,000,000 centistokes or, preferably, from 5 to 10,000 centistokes at 25° C.

The componet (b) is an organosilicon compound represented by the general formula $R^1_a Y_b Si$, in which $R^1$, Y, a and b each have the meaning as defined above. The group denoted by $R^1$ is a substituted or unsubstituted monovalent hydrocarbon group having 1 to 20 carbon atoms selected from the class consisting of alkyl groups such as methyl, ethyl, propyl and butyl groups, cycloalkyl groups such as cyclohexyl and cyclopentyl groups, alkenyl groups such as vinyl and allyl groups, aryl groups such as phenyl, tolyl and xylyl groups and aralkyl groups suoh as benzyl and phenylethyl groups as well as those substituted groups obtained by the replacement of all or a part of the hydrogen atoms in the above named hyrocarbon groups with substituents such as halogen atoms and the like exemplified by chloropropyl, tetrachlorophenyl, trifluoropropyl and 2-(perfluorohexyl)ethyl groups. The group denoted by Y is a functional group selected from the class consisting of alkoxy, acyloxy and alkenyloxy groups having from 1 to 6 carbon atoms and hydroxy group including, for example, methoxy, ethoxy, propoxy, butoxy, acetoxy and isopropenyloxy groups. The suffixes a and b are each a positive integer of 1, 2 or 3 with the proviso that $a+b=4$.

Particular examples of the organosilicon compound in conformity with the above given general formula and definitions of the symbols include: methyl trimethoxysilane; methyl triethoxysilane; methyl triacetoxysilane, dimethyl dimethoxysilane; dimethyl diethoxysilane; methyl tri(isopropenyloxy)silane; dimethyl diacetoxysilane, di(2-phenylmethyl)silane diol; methylsilane triol, dimethylsilane diol; 2-phenylethyl trimethoxysilane; vinyl trimethoxysilane; 3-chloropropyl trimethoxysilane; 3-chloropropyl methyl dimethoxysilane; vinyl tri(2methoxyethoxy)silane; 3,3,3-trifluoropropyl trimethoxysilane; 2-(perfluorohexyl)ethylsilane triol; di 2-(perfluorohexyl)ethyl dimethoxysilane; octyl trimethoxysilane; triethyl silanol; dioctyl dipropionyloxysilane and the like.

The amount of the organosilicon compound as the component (b) in the inventive antifoam composition should be in the range from 0.1 to 40 parts by weight or, preferably, from 0.3 to 10 parts by weight per 100 parts by weight of the hydrophobic base fluid as the component (a). When the amount of the component (b) is too small, the desired effect thereof cannot be exhibited as a matter of course while an excessively large amount thereof is also detrimental to the defoaming activity of the resultant antifoam composition.

The finely divided silica powder as the component (c) may be any of known silica fillers produced by the dry process or wet process including precipitated silica fillers, silica xerogels and fumed silica fillers as well as those silica fillers blocked on the surface with organosilyl groups. Various commercial products available on the market are suitable as the component (c) as sold under the tradenames of, for example, Aerosil manufactured by Nippon Aerosil Co., Nipsil manufactured by Nippon Silica Co., Cabosil manufactured by Cabot Inc., Santocel manufactued by Monsanto Chemical Co. and the like. The finely divided silica powder used as the component (c) should have a specific surface area of at least 50 $m^2/g$. The amount of the finely divided silica powder as the component (c) in the inventive antifoam composition should be in the range from 1 to 4 parts by weight or, preferably, from 3 to 20 parts by weight per 100 parts by weight of the hydrophobic base fluid. When the amount of the component (c) is smaller than 1 part by weight, the full effectiveness of the antifoam composition cannot be exhibited while an excessively large amount of the component (c) may cause an undue increase of the consistency of the antifoam composition with decreased workability and difficulties in handling.

The component (d) is a catalyst which is an optional component added to the antifoam composition according to need in an amount of up to 5 parts by weight per 100 parts by weight of the hydrophobic base fluid as the component (a). This component is added when it is desired to accelerate the reaction between the functional groups in the organosilicon compound as the component (b) and the silanolic hydroxy groups on the surface of the finely divided silica powder as the component (c). Suitable compounds having catalytic activity includes organic acid salts of a metal such as tin, lead, zirconium, zinc, iron, manganese, platinum and the like and organometallic ester compounds exemplified by dibutyltin diacetate, dibutyltin dilaurate, dioctyltin dilaurate, dibutyltin dioctoate, tin caprylate, zirconium naphthenate, manganese naphthenate, tetrabutyl titanate and the like. An excessively large amount of the catalyst over 5 parts by weight is detrimental to the defoaming activity of the antifoam composition per 100 parts by weight of the hydrophobic base fluid as the component (a).

The antifoam composition of the invention can readily be prepared by uniformly blending the above described components (a), (b), (c) and, optionally, (d) in a suitable blending machine. The actual form of the inventive antifoam composition to be added to a foaming liquid may be a solution or dispersion of the thus prepared composition in an organic solvent or an aqueous emulsion of the composition emulsified by use of a suitable surface active agent in an aqueous medium. The organic solvent suitable for the preparation of an organic solution or dispersion of the composition is exemplified by aliphatic hydrocarbon solvents, aromatic hydrocarbon solvents, chlorinated hydrocarbon solvents, etheric solvents and alcoholic solvents and the surface active agent suitable for use in the preparation of an aqueous emulsion type composition is exemplified by sorbitan fatty acid esters, glycerin fatty acid esters, propyleneglycol fatty acid esters, polyoxyethylene fatty acid esters, polyoxyethylene sorbitan fatty acid esters, polyoxyethylene alkyl ethers, block copolymers of ethyleneoxide and propyleneoxide and the like though not limited thereto. The aqueous emulsion type composition may further be admixed with a water-soluble polymeric compound such as methylcellulose, plyvinyl alcohol, sodium alginate, fatty acid esters of sucrose, hydroxyethylecellulose, carboxymethyl cellulose and the like which serve as a protective colloid, thickener and stability improver.

Although the antifoam composition of the invention may be added to a foaming liquid as such or in the form of an organic solution or dispersion or an aqueous emulsion as is mentioned above, an alternative form of the antifoam composition is a powdery antifoam composition prepared by admixing the inventive composition with a finely divided powdery carrier such as methylcellulose, polyvinyl alcohol, lactose, dextrin, finely divided hydrophilic silica powder, starch and the like together with a surface active agent as named above. A further alternative form of the inventive antifoam composition is a lumpy solid prepared by blending and kneading the composition with a solid surface active agent, water-soluble wax and the like.

In the following, the antifoam composition of the present invention is described in more detail by way of examples, in which the values of the viscosity are all given by the results of the viscosity measurements carried out at 25° C. and the results of the durability test of the defoaming activity were obtained by the testing procedure described below.

Durability test of the defoaming activity: 100 g of a 0.2% aqueous solution of sodium oleate were taken in a graduated glass cylinder of 1000 ml capacity followed by the adjustment of the pH to 11 with addition of a small volume of an aqueous solution of sodium hydroxide and addition of a predetermined amount of the antifoam composition under testing. Then, air was bubbled in the thus prepared foaming liquid through a sintered glass frit ball dipped therein continuously at a rate of 1 liter/minute and the change of the foam level in time was read on the scale of the graduated cylinder and recorded.

EXAMPLE 1

Antifoam compositions A to G according to the invention in the form of a pasty compound were prepared each by uniformly blending a dimethyl silicone fluid of various viscosities (KF 96, products by Shin-Etsu Chemical Co.) or a spindle oil (#60, a product by Showa Petroleum Co.) as the component (a), an organosilicon compound as the component (b) and a finely divided silica powder as the component (c) each of the kind and in an amount shown below at 150° C. for 3 hours. For comparison, comparative antifoam compositions H to L were prepared in a similar manner to the above but with omission of the organosilicon compound as the component (b) or with replacement of the component (b) with a different kind of an organosilicon compound not in conformity with the definition of the component (b).

Each of the thus prepared antifoam compositions A to L in the form of a pasty compound was dispersed in tetrahydrofuran in a concentration of 10% by weight and the dispersions were subjected to the durability test of the defoaming activity to give the results shown in Table 1. The amount thereof added to the foaming liquid was 500 p.p.m. of the foaming liquid excepting the tetrahydrofuran.

Antifoam composition A

| | |
|---|---|
| Dimethylsilicon fluid, 1000 centistokes | 200 g |
| Methyl trimethoxysilane | 6 g |
| Aerosil 300 | 14 g |
| Antifoam composition B | |
| Dimethylsilicone fluid, 1000 centistokes | 200 g |
| Ethyl triacetoxysilane | 6 g |
| Aerosil 200 | 14 g |
| Dioctyltin dilaurate | 0.5 g |
| Antifoam composition C | |
| Dimethylsilicone fluid, 300 centistokes | 200 g |
| Vinyl tripropenyloxysilane | 6 g |
| Nipsil LP | 14 g |
| Antifoam composition D | |
| Dimethylsilicone fluid, 300 centistokes | 200 g |
| Trimethyl silanol | 8 g |
| Nipsil LP | 12 g |
| Tetrabutyl titanate | 0.5 g |
| Antifoam composition E | |
| Dimethylsilicone fluid, 100 centistokes | 200 g |
| Methyl 3-chloropropyl dimethoxysilane | 8 g |
| Carplex #67 (silica product by Shionogi & Co.) | 12 g |
| Antifoam composition F | |
| Dimethylsilicone fluid, 400 centistokes | 200 g |
| Methyl 3,3,3-trifluoropropyl dimethoxysilane | 8 g |
| Aerosil 300 | 12 g |
| Antifoam composition G | |
| Spindle oil #60 | 200 g |
| 2-(perfluorohexyl)ethyl triethoxysilane | 6 g |
| Aerosil 300 | 14 g |
| Antifoam composition H | |
| Dimethylsilicone fluid, 1000 centistokes | 200 g |
| Aerosil 300 | 18 g |
| Antifoam composition I | |
| Diemthylsilicone fluid, 100 centistokes | 200 g |
| Hydroxy-terminated dimethylpolysiloxane, 100 centistokes | 50 g |
| Nipsil LP | 16 g |
| Antifoam composition J | |
| Dimethylsilicone fluid, 1000 centistokes | 200 g |
| Methylhydrogenpolysiloxane, 20 centistokes | 4 g |
| Aerosil 300 | 16 g |
| Antifoam composition K | |
| Dimethylsilicone fluid, 300 centistokes | 200 g |
| Aerosil R972 (surface-treated with chlorosilane) | 18 g |
| Antifoam composition L | |
| Dimethylsilicone fluid, 300 centistokes | 200 g |
| Arosil 200 treated with trimethylsilyl amine | 18 g |

TABLE 1

| Antifoam composition | Volume of foams, ml, after lapse of | | | | | |
|---|---|---|---|---|---|---|
| | 5 minutes | 10 minutes | 15 minutes | 20 minutes | 25 minutes | 30 minutes |
| A | 140 | 140 | 150 | 180 | 200 | 220 |
| B | 160 | 180 | 200 | 235 | 240 | 260 |
| C | 145 | 160 | 170 | 190 | 210 | 230 |
| D | 150 | 160 | 165 | 160 | 165 | 170 |
| E | 180 | 190 | 210 | 240 | 260 | 300 |
| F | 160 | 165 | 180 | 190 | 220 | 230 |
| G | 180 | 240 | 280 | 360 | 400 | 460 |
| H | >1000 | | | | | |
| I | 830 | >1000 | | | | |
| J | 490 | 640 | 740 | 900 | >1000 | |
| K | >1000 | | | | | |
| L | 285 | 330 | 360 | 450 | 530 | 620 |

EXAMPLE 2

Antifoam emulsions A to L were prepared each by admixing 10 parts by weight of one of the antifoam compositions A to L, respectively, prepared in Example 1 with 2 parts by weight of a fatty acid ester of sorbitan (Span 80, a product by Kao Atlas Co.) and 3 parts by weight of a polyoxyethylene sorbitan fatty acid ester (Tween 60, a product by the same company as Span 80)

and blending the mixture at 60° to 70° C. for 10 minutes followed by emulsification by agitating with a homomixer for 20 minutes together with 85 parts by weight of water.

The durability test of the defoaming activity was undertaken by adding 2000 p.p.m. of one of the thus prepared antifoam emulsions A to L in the form of an aqueous dispersion containing 10% by weight thereof to the foaming liquid in the graduated cylinder to give the results shown in Table 2.

EXAMPLE 3

Powdery antifoam compositions A to L were prepared each by forcibly mixing 100 parts by weight of a finely divided silica powder having a specific surface area of 185 m²/g, average particle diameter of 160μm and bulk density of 210 g/liter with 50 parts by weight of one of the antifoam compositions A to L prepared in Example 1 and 50 parts by weight of a polyether-modified organopolysiloxane expressed, denoting a methyl group by the symbol Me, by the formula

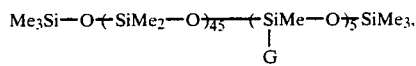

in which G is a polyoxyalkylene group of the formula $-(CH_2)_3O-(CH_2-CH_2-O)_5-(CHMe-CH_2-O)_{10}-H$.

TABLE 2

| Antifoam emulsion | Volume of foams, ml, after lapse of | | | | | |
|---|---|---|---|---|---|---|
| | 5 minutes | 10 minutes | 15 minutes | 20 minutes | 25 minutes | 30 minutes |
| A | 155 | 160 | 160 | 170 | 170 | 180 |
| B | 160 | 170 | 220 | 300 | 340 | 380 |
| C | 160 | 165 | 175 | 180 | 190 | 200 |
| D | 140 | 145 | 145 | 150 | 150 | 160 |
| E | 170 | 180 | 220 | 320 | 400 | 480 |
| F | 160 | 170 | 175 | 190 | 200 | 220 |
| G | 180 | 240 | 300 | 380 | 460 | 540 |
| H | 760 | >1000 | | | | |
| I | 650 | 680 | >1000 | | | |
| J | 400 | 700 | 780 | >1000 | | |
| K | 540 | 730 | 735 | >1000 | | |
| L | 240 | 380 | 550 | 735 | 820 | 880 |

Into a graduated glass cylinder of 1000 ml capacity were taken 100 g of a 0.02 % aqueous solution of a polyoxyethylene nonyl pheyl ether having an HLB value of 13 with admixture of 0.5 g of one of the thus prepared powdery antifoam compositions A to L and the durability of the defoaming activity was tested by bubbling air into the solution in the same manner as in the preceding examples and the change of the foam level in time was recorded to give the results shown in Table 3 below.

TABLE 3

| Powdery antifoam composition | Volume of foams, ml, after lapse of | | | |
|---|---|---|---|---|
| | 5 minutes | 10 minutes | 15 minutes | 20 minutes |
| A | 280 | 280 | 290 | 300 |
| B | 290 | 320 | 370 | 440 |
| C | 320 | 350 | 400 | 450 |
| D | 240 | 250 | 250 | 260 |
| E | 360 | 420 | 440 | 460 |
| F | 280 | 310 | 350 | 380 |
| G | 300 | 330 | 380 | 400 |

TABLE 3-continued

| Powdery antifoam composition | Volume of foams, ml, after lapse of | | | |
|---|---|---|---|---|
| | 5 minutes | 10 minutes | 15 minutes | 20 minutes |
| H | 820 | >1000 | | |
| I | 770 | 950 | >1000 | |
| J | 520 | 590 | 680 | 840 |
| K | 550 | 780 | 980 | >1000 |
| L | 460 | 540 | 760 | 920 |

What is claimed is:

1. An antifoam composition which comprises:
   (a) 100 parts by weight of a hydrophobic base fluid selected from the class consisting of hydrocarbon oils and organopolysiloxane fluid having a viscosity in the range from 20 to 1,000,000 centistokes at 25° C.;
   (b) from 0.1 to 40 parts by weight of an organosilicon compound represented by the general formula $R^1{}_aY_bSi$, in which $R^1$ is a substituted or unsubstituted monovalent hydrocarbon group having 1 to 20 carbon atoms, Y is a monovalent group selected from the class consisting of alkoxy groups, acyloxy groups and alkenyloxy groups having 1 to 6 carbon atoms and a hydroxy group and the suffixes a and b are each a positive integer of 1, 2 or 3 with the proviso that a+b=4;
   (c) from 1 to 40 parts by weight of a finely divided silica powder; and
   (d) up to 5 parts by weight of a catalyst.

2. The antifoam composition as claimed in claim 1 wherein the hydrocarbon oil is a spindle oil.

3. The antifoam composition as claimed in claim 1 wherein the organopolysiloxane fluid is a compound expressed by the average unit formula

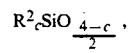

in which $R^2$ is a substituted or unsubstituted monovalent hydrocarbon group having 1 to 20 carbon atoms and c is a positive number in the range from 1.9 to 2.1.

4. The antifoam composition as claimed in claim 1 wherein the organopolysiloxane fluid is a polydimethylsiloxane fluid.

5. The antifoam composition as claimed in claim 1 wherein the hydrophobic base fluid has a viscosity in the range from 50 to 10,000 centistokes at 25° C.

6. The antifoam composition as claimed in claim 1 wherein the catalyst is selected from the class consisting of dibutyltin diacetate, dibutyltin dilaurate, dioctyltin dilaurate, dibutyltin dioctoate, tin caprylate, zirconium naphthenate, manganese naphthenate and tetrabutyl titanate.

* * * * *